US005557057A

United States Patent [19]

Starr

[11] Patent Number: 5,557,057

[45] Date of Patent: Sep. 17, 1996

[54] ELECTRONIC KEYBOARD INSTRUMENT

[76] Inventor: Harvey W. Starr, 1717 Fifth Ave., San Diego, Calif. 92111

[21] Appl. No.: 182,767

[22] Filed: Jan. 14, 1994

Related U.S. Application Data

[63] Continuation-in-part of Ser. No. 813,996, Dec. 27, 1991.

[51] Int. Cl.[6] .................................. G10H 7/00; H04J 3/00

[52] U.S. Cl. .................................. 84/617; 84/646; 84/655; 84/DIG. 30

[58] Field of Search .............................. 84/646, 653, 655, 84/615, 617, 658, 626, 669, 670, 644, 637, DIG. 30

[56] References Cited

U.S. PATENT DOCUMENTS 4,177,705 12/1979 Evangelista .................................. 84/646
5,065,659 11/1991 Uchiyama et al. ................ 84/DIG. 30

*Primary Examiner*—Cassandra C. Spyrou

*Attorney, Agent, or Firm*—Wagner & Middlebrook

[57] ABSTRACT

An electronic musical instrument is designed in a generally guitar-shaped configuration with a fingerboard containing rows of keys replacing each string, one key for each string/fret position. Pressing on a key causes a signal to be provided to a central processing unit which continually scans the fingerboard at a high rate and converts the signals to a plurality of outputs to a synthesizer. Unlike a guitar, a plurality of keys, including a plurality along a single row, may be operated simultaneously to produce a plurality of notes simultaneously. A number of pressure switches and other switches located on the body enable a player to modify the output with vibrato, pitchbend, stereo pan, percussion effects, etc. Additional pressure responsive circuits provide inputs to the central processing unit varying with pressure on the keys. A second embodiment includes a fingerboard with many more rows or columns of keys and more keys per column. In either embodiment the keys may be colored similarly to a piano keyboard or otherwise either embodiment may have a specified or programmable musical interval between adjoining keys on adjacent rows.

13 Claims, 5 Drawing Sheets

FIG. 1
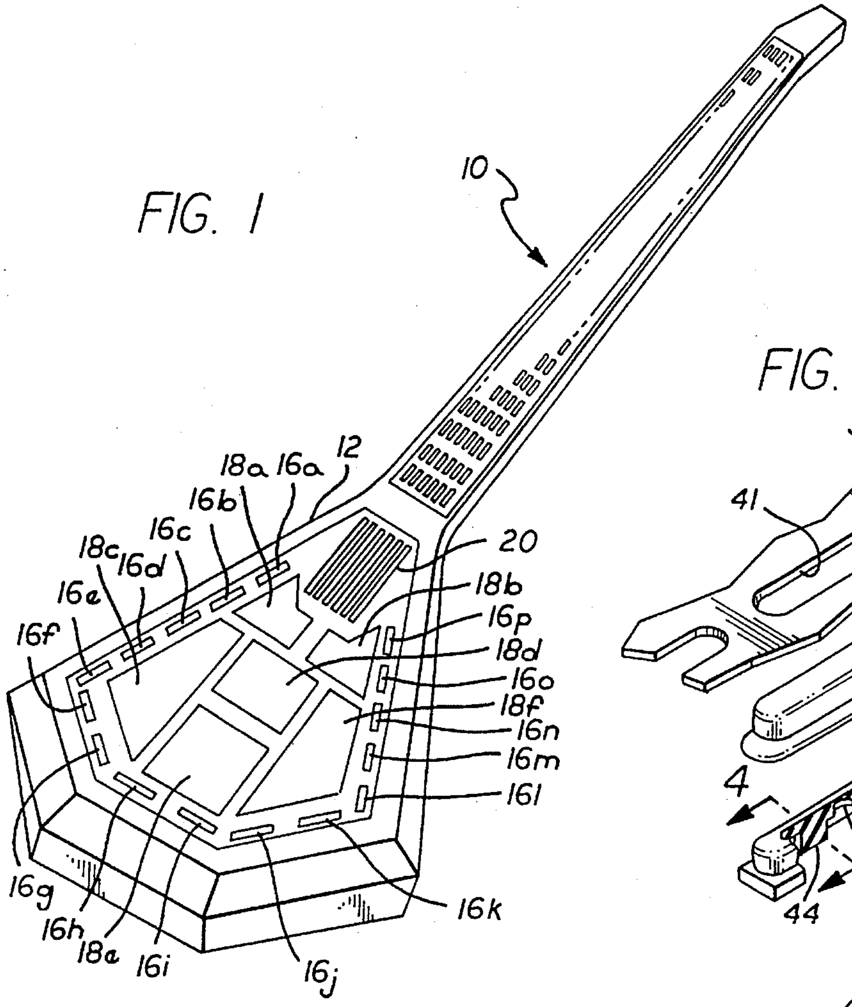
FIG. 3
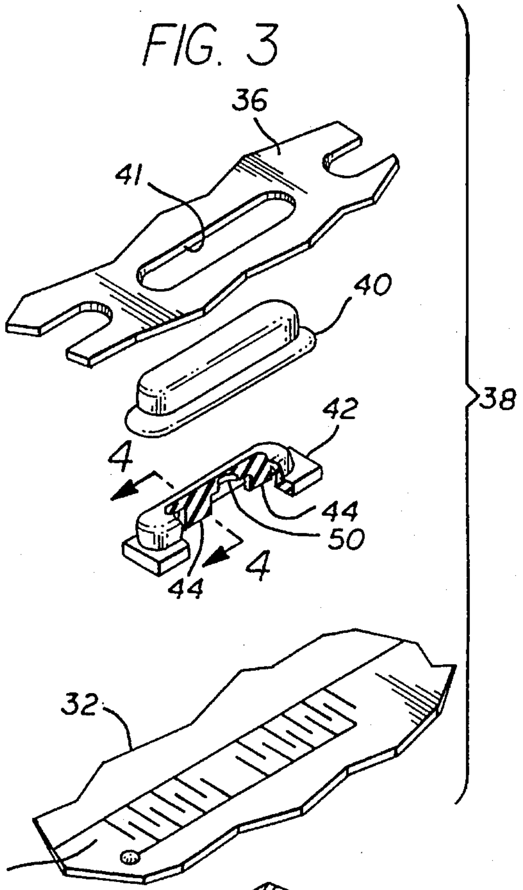
FIG. 4
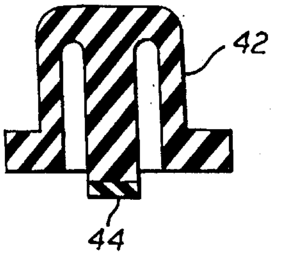
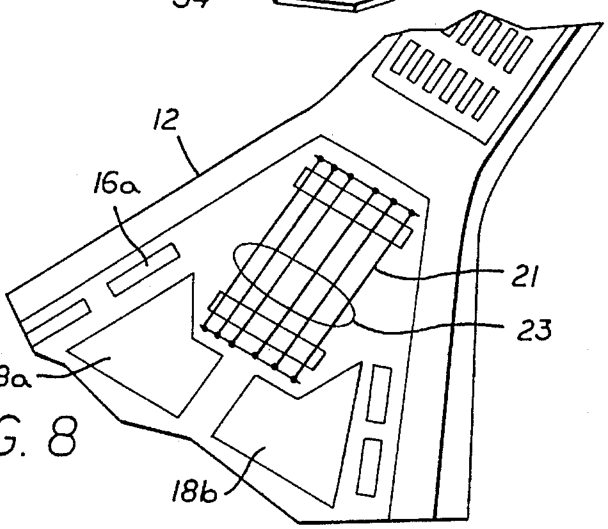
FIG. 8

ELECTRONIC KEYBOARD INSTRUMENT

REFERENCE TO RELATED APPLICATION

This is a continuation-in-part of co-pending application Ser. No. 07/813,996 filed Dec. 27, 1991.

BACKGROUND OF THE INVENTION

This invention relates to improvements in electronic musical instruments to be played as an input to a music synthesizer and more particularly to an instrument which may simulate some aspects of operation of a stringed instrument such as a guitar.

In the art of electronic music and musical instruments many input devices are now essentially digital switching devices and operate in conjunction with a type of standardized digital interface called a MIDI (Musical Instrument Digital Interface) which connects to a music synthesizer. Current synthesizers are extremely versatile; many produce tones similar to several musical instruments. Some can reproduce almost any sound through electronically recorded sampling or create new sounds. Because of the modular nature of the synthesizer voice modules it is not necessary for such input devices themselves to include tone generators or other sound generating means. They only need to produce a digital output which is compatible with the MIDI specification.

There have been many attempts to produce electronic musical instruments which simulate, to greater or less degree, the operation of an acoustic guitar. A number of the patents showing such devices include internal tone generators. One such patent which also substitutes keys on the fingerboard for the strings, but which places a key at each string/fret location, is Gasser U.S. Pat. No. 3,555,166. By this is meant that each of the six strings is located over a number of frets such as 20. An acoustic guitar is played by holding a particular string down against the fingerboard between particular fret positions and picking the string to produce a given note. In the electronic instrument described, a key is placed at each such string/fret position, resulting in six rows or columns of keys, each having 20 keys (or more) in each row, or 120 keys.

Other electronic guitar-like instruments are taught in U.S. Pat. Nos. 4,336,734; 4,570,521; RE 31,019; 4,570,521; and 4,630,520, some of which incorporate strings. Frequently, such instruments incorporate additional switching means placed on the body for various purposes such as making chords, tuning, and expression and modulation information for the synthesizer.

Although some of the prior art patents emphasize various means employed to make such instruments convenient and accessible to one used to playing an acoustic guitar, applicant's experience with at least some of such instruments is that they tend to impose some of their own difficulties and obstacles. At the same time, some such instruments fail to adequately utilize the potential that current technology makes possible for expanding the capabilities of the instrument.

It is, therefore, an object of the present invention to provide an electronic keyboard instrument for use with a synthesizer offering fretboard technique similar to a stringed guitar but which affords greater flexibility and ease in fingering to produce many additional chords and note combinations and, in particular, makes it possible to play simultaneously, a plurality of notes along a single row of keys (string position).

It is another object of the present invention to provide a keyboard instrument meeting the above objective while providing a simplified and reliable keyboard structure.

It is another object of the present invention to provide a keyboard instrument meeting the above objectives and which includes circuit means providing extremely fast response to actuation of any fret on the keyboard.

It is another object of the present invention to provide a keyboard instrument meeting the above objectives and in which through the use of a simplified structure, the keys are truly consistent and reliably touch sensitive, i.e. the electrical output from each key depression varies consistently with the pressure on the key and which output is sustained with sustained key pressure.

It is another object of the present invention to provide an electronic keyboard instrument incorporating its own signal processor which is compatible with standard MIDI connection devices to a synthesizer.

It is another object of the present invention to provide an electronic keyboard instrument in which adjacent rows of keys are musically related by a specific musical interval such as a third or a fourth, which interval is programmable. This type of programmability is extended to each note individually by on-board software which can relate a table of values to each key.

It is a further object of the present invention to provide an electronic keyboard instrument which meets the above objectives, but which includes a substantially greater number of rows of keys than would be required to represent strings of the usual acoustic guitar.

It is a further object of the present invention to provide an electronic keyboard instrument which meets the above objectives and allows the active sensing of and responding to any key in a two-dimensional matrix of keys at any time during a musical performance.

It is a further object of the present invention to provide an electronic keyboard instrument which meets the above objectives and in which the keys are combined with a short string section to enhance the guitar-like feel of the instrument.

It is a still further objective of the present invention to provide a keyboard instrument meeting the above objectives and in which a chord memory feature is included permitting a substantial number of notes to be retained in memory and played as a chord with a single stroke.

It is a still further objective of the present invention to provide a keyboard instrument meeting the above objectives and in which selected rectangular areas of the fingerboard may be assigned selected responses such as piano sound, violin sound, transpositions, or selected MIDI channels with patch numbers.

BRIEF DESCRIPTION OF THE INVENTION

The present invention is basically a player actuated switching mechanism for an electronic music synthesizer. In its preferred embodiment it includes a fingerboard and a main body with the fingerboard including a set of keys, one for each fret/string position as described. The keys include carefully sized metallic switch contacts which act against a constant conductivity silicone rubber pad. When pressed, each key makes contact with the rubber pad providing an output whose amplitude varies with the pressure applied to the key. This output is sustained so long as the pressure on the key remains. Key output signals can be provided from any number of rows and from more than one key in a single row simultaneously.

In one embodiment the keys are arranged in, for example, six rows of twenty, each row having key/fret positions like that of an acoustic guitar. One familiar with playing an acoustic guitar could play such an instrument almost immediately and would soon learn that he had many more combinations of notes that could be played than is possible with an acoustic guitar.

Another embodiment, constructed on the same principles includes many more rows of keys, for example twelve rows, and is fashioned in a fingerboard which is preferably played with the instrument supported on a table and with the player using both hands to operate the fingerboard. The key intervals represent the 12-tone chromatic scale by adjacent keys along a given row, and adjacent keys in adjoining rows are related by a desired interval, such as fourths, the interval being programmable. If the associated synthesizer is capable of producing a number of different types of sounds simultaneously, which most can do, either the guitar-like instrument or the second described twelve row instrument can be programmed to produce, for example, piano sounds on part of the keyboard, organ-like sounds on another part while simultaneously producing desired percussion sounds. In either of the embodiments discussed above, the keys may be color-coded like the black and white keys of a piano. Other color coding schemes may be used.

The fingerboard has the advantage that in the location of one string (one row of keys) more than one key can be played at a time. This can provide some real advantages in fingering compared to an acoustical guitar where only one note can be played per string at a given time and musical intervals between notes must be played on separate strings. For example, the minor second interval, a space of just one half step on the musical scale, can be played on the piano by striking two adjacent keys. On an acoustic guitar a wide stretch of five frets between two adjacent strings is required for the same result. In the instrument described herein the notes are played by adjacent keys along the same row. This makes close voicing of chords, customary in piano literature, easy to effect on a guitar-like instrument. A corollary benefit allows the playing of two-handed music, such as piano music. Multiple notes may be heard from a single simulated string (row of keys). A chord or melody line may be played with one hand and a second chord or melody line played with the other at another position along the neck of the instrument.

The fingerboards described above produce signals processed in a central processing unit as a MIDI code which determines the pitch of a MIDI controllable voice, as in a synthesizer. The fingerboard provides for the sensing of varying amounts of finger pressure as amplitude information. Other switches provided inputs which may be used to affect various dynamic parameters of the music such as volume, pitchbend, vibrato, various filter sweep functions or note attack, etc.

To enhance the signal processing between the fingerboard and the central processing unit, applicant has devised a modified circuit.

In order to collect continuously linearly-variable analog data from a large key-matrix at a rate sufficient to prevent any audible delays in the delivery of the actual sounds, it was found useful to develop certain techniques. First the key matrix is organized in a row and column format. Further, each string is split into separate groups of eight keys. The outputs from these groups of eight keys are routed to both an eight-input voltage comparator and an eight-input analog-to-digital converter. The controlling software first queries the 8-input voltage comparator to determine whether any of the eight sampled keys show a condition other than zero, or OFF. This takes place very quickly, in the order of tens of nanoseconds. Should this result show all the keys to be OFF the next group of eight is quickly accessed and another comparison made. Should the results of the comparison show the presence of a key depression, that keys voltage may then be converted by the A/D converter to determine its actual value. In practice, these conversions may require from 1 microsecond to tens of microseconds using currently available hardware. By adding a key signal path to the front-end comparator circuit a net speed of the scanning system was improved by a factor of 20 versus using the A/D converter alone to determine the note-key data.

The musical instrument of the first embodiment also involves the use of a separate keypad assembly on top of the face of the body. This keypad has three main sections.

1. A single row of sixteen keys encircles the perimeter of the keypad. These are used to control the volume, octave shift, tuning and other valuable performance parameters.

2. An array of six large centrally positioned rubber pads to be struck or pressed by a musician to alter certain dynamic characteristics of his musical performance such a pitchbending, vibrato, or stereo pan. Or they may be programmed to trigger musical sounds such as preprogrammed chords or percussion sounds. These large rubber pads have force sensitive material on the underside which make contact with a multiplicity of printed circuit conductors to provide variable resistances whose values vary with the pressure applied to them.

3. An array of six long thin rubber pads placed to simulate the section of strings which would normally sit under a player's fingers of the plucking or strumming hand were he playing an acoustic guitar. These serve to individually affect certain musical notes as they are being held, on a string by string (or row by row) basis. These pads may be used to affect volume levels, pitch, frequency spectrum, intervals between adjacent keys in different rows, signal modifier levels and many local and MIDI programmable functions. In one embodiment, the six long thin rubber pads are replaced with six short strings which operate in conjunction with an electrical pickup. This gives the instrument a very guitar-like feel.

The requirement for applicant's fingerboard is for a large array of small keys, each of which has a very short travel, roughly 1 millimeter. The keys must be narrow, about 1/10 of an inch or slightly less, to simulate the feel of a guitar string. Also, adjacent rows of keys must be placed 0.3–0.4 inches apart to simulate adjacent strings on a guitar neck. The keys must deliver a continuously variable response to the force of the initial stroke and thereafter a response to continued pressure on the key after the initial stroke. Due to the small size and spacing requirements for the individual keys, the mechanical key switching technique used in most piano-style keyboards is not suitable. This technique relies on the sequential closure of separate metallic contacts to determine the speed of the key's travel. However, the short travel of applicant's key 42 will not permit the exploitation of this effect. However, it was found that by careful selection of the size and geometry of a constant-conductivity silicone rubber pad and the size and spacing of the mating metallic switch contacts, an effect was achieved which would produce a variable resistance with a varying pressure on the switch key. This is achieved at no extra expense beyond the cost of the standard silicone rubber keypad. This type of pressure-sensitive switch allows both the initial stroke and the subsequent applied force on a key to be readily accessed by the controlling electronics system. The cost of this type of switch is minimal and requires no moving parts other than the rubber switch itself.

BRIEF DESCRIPTION OF THE DRAWINGS

This invention may be more clearly understood from the following detailed description and by reference to the drawing in which:

FIG. 1 is a perspective view of a guitar-like musical instrument according to my invention;

FIG. 3 is an exploded view showing details of the fingerboard structure of the device of FIGS. 1 and 2.

FIG. 4 is an enlarged cross sectional view taken along line 4—4 of FIG. 3;

FIG. 8 is an enlarged view of the encircled portion of FIG. 1 showing an alternative embodiment of my invention.

DETAILED DESCRIPTION OF THE INVENTION

Figure 2:
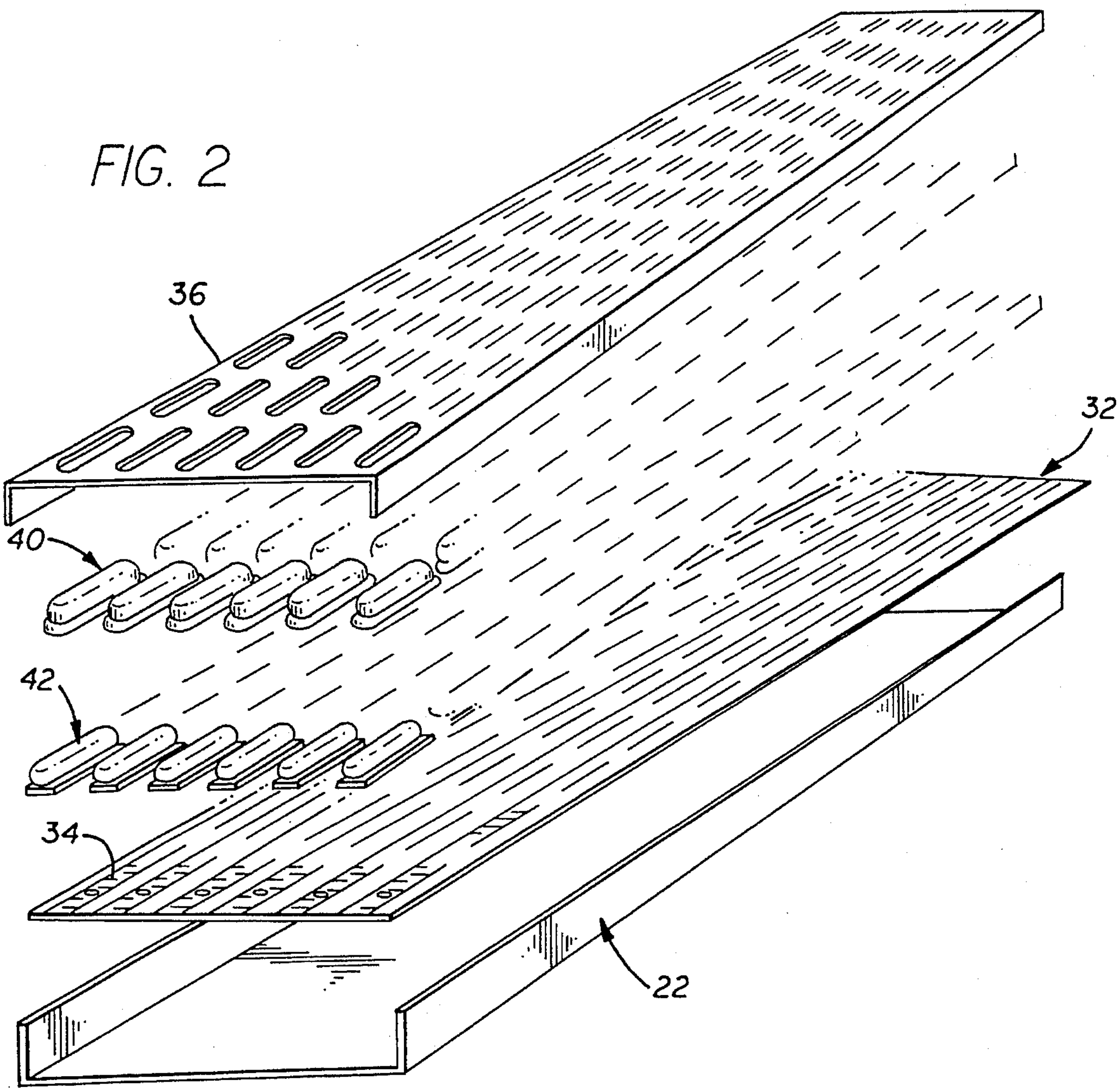
FIG. 2 is a fragmentary exploded view of the fingerboard of FIG. 1.

Referring now to FIG. 1, the instrument has a guitar-like configuration with an elongated fingerboard 10 attached to a larger body 12. The fingerboard 10 includes six rows of 20 individual keys which are generally arranged similarly to the string/fret arrangement of a conventional guitar. Thus where a guitar has, for example, six strings with 20 finger positions (frets) along each string, the present fingerboard has one key for each finger position along each of six rows of keys spaced essentially like the strings of an acoustic guitar. With this arrangement it is a relatively straightforward matter for one having familiarity with the guitar keyboard to make the adjustment from plucking the string while pressing it at a given location, to pushing a key at the same location. Since the key is operating an electrical switching circuit, very little force is required to push the key and the player will find that playing applicant's instrument is much easier on his fingers as compared with plucking guitar strings.

Located on the periphery of the body 12 are a series of sixteen keys or push buttons 16*a*–16*p*; generally centered on the body 12 are a group of six pressure sensitive drum pads 18*a*–18*f* which may be used to trigger synthesized drum sounds among other functions such as pitchbend, modulation, MIDI after pressure and stereo pan, a group of six elongated switches 20 referred to below as trigger bars which are generally aligned with the rows of keys on the keyboard and which also may be used to trigger synthesized drum sounds. Push buttons 16*a*–16*p* may be used for many functions of which the following are exemplary:

16*a*—discussed below

16*b*—fail safe in case of stuck note. Sends MIDI message "all notes off"

16*c*—varies offsets between adjacent rows of keys, such as:

1) standard guitar tuning for open strings;
2) perfect fourth intervals as in bass guitar;
3) perfect fifth intervals as in the violin family;
4) diminished fifth intervals;
5) augmented fifth intervals ascending by row;
6) open E chord ascending by row.

16*d*—enables the drum mode which assigns pressure pads 18*a*–18*f* to various percussion sounds or other sounds within the synthesizer.

16*e*—sostenuto. Fingerboard keys which are held while the sostenuto button is held, will sustain until this button is depressed again.

16*f*—volume up—raises the volume of the entire instrument when in single-channel mode or just the selected string/channel when in six-channel mode.

16*g*—volume down—lower the volume in the same way.

16*h*—octave up—raises the pitch of the full fingerboard by octaves when in single-channel mode and just the selected string/channel when in six-channel mode.

16*i*—octave down—lowers the pitch in the same way.

16*j*—Patch Change Up increments the current Patch selection to the entire fingerboard in single-channel mode and just the selected string/channel in six-string mode.

16*k*—Patch Change Down decrements the current Patch selection in the same way.

16*l*—Hold sends the MIDI Hold message to the selected output channel which has the effect of sustaining all notes played thereafter until the Hold button is pressed again.

16*m*—the Lock button is used to enable/disable the entire Control Panel to prevent undesired effects from accidentally brushing a control key while playing.

16*n*—Guitar/Poly switches between the six-string Guitar mode which allows only one note per string as in a vibrating string instrument, and the Poly mode in which any key which is pressed will sound regardless of location.

16*o*—enables or disables the trigger function of the six rubber bars 20.

16*p*—this is a 1/6 button which selects the number of MIDI channels on which the instrument may transmit. "1", or single-channel mode outputs all notes to the same channel, usually channel #1. "6", or multi-channel mode, outputs the notes from each string or row of fingerboard keys on separate channels, #1 through #6. In this mode a different instrument's sound may be set up on each string giving the effect of a larger orchestra. Individual channel parameters are programmed by pressing a given string trigger bar while pressing key #1, Channel Select. By using these features, six separate instruments may be chosen and mixed to create a properly blended combination played from a single fingerboard.

The six elongated trigger bars 20 are generally aligned physically with the six rows of keys on the fingerboard 10. As stated above these trigger bars 20 may be used to vary volume levels, pitch and many MIDI effects. They may be used to limit the MIDI effects on a row by row (string by string) basis.

A modified embodiment is shown on FIG. 8 wherein the trigger bars 20 are replaced by a series of 6 strings. This enables one used to playing a guitar to strum the strings 21 while operating the keys of the key board which provides a feel very close to that of a guitar. An electrical pickup 23 senses the string vibrations and supplies corresponding electrical signals to the central processing unit.

Each of these switch devices **16*a*–16*b* and trigger bars 20** is connected to a central processing unit (CPU) located inside the body (discussed below) and which is designed to provide a MIDI output to a synthesizer. Those skilled in the art will recognize that there are many functions that can be programmed into the CPU. The above description of functions assigned to each switch is exemplary only—many other arrangements could be used.

Certain terms need to be understood in the context of the present application. The varying response of the switch is used at the time of initial contact in conjunction with a time measurement to provide velocity information, a measure of the force with which the key is struck. This is used for various musical accents. To re-state this: as the key is struck with greater force its terminal resistance is reached more quickly. Following this a higher voltage is presented to the Analog-to-Digital converter at its first sample of the key for a given scan cycle. The CPU translates this higher voltage to a binary number which elicits a greater volume (or some other parameter) for the note struck.

The same key-mechanism, when held, is used to provide further pressure information ("aftertouch") for additional accents such as timber change (changes to the frequency spectrum of the audio signal), volume changes, crossfades to other sounds and threshold triggers for other musical events. Further, existing musical keyboard of any variety uses this technology for sensing both velocity and aftertouch.

Patches of the instrument called SONG. A Song stores a complete configuration for the instrument in memory with its own name. This includes fingerboard splits/layers and all of the Pad/MIDI controller assignments including any recorded Notes, Chords, or Drums. When a Song is selected, all of its parameters are placed in an active temporary buffer, so that one may make changes to his or her setup as it is played.

Layers in the instrument environment are arbitrary rectangular zones of the fingerboard which are assigned one or two MIDI channels, selected message types, a tuning, transposition, octave and patch number(s).

Up to sixteen layers may be configured at any time. A layer may be a small as one note or as large as the entire fingerboard. Layers, (or zones) may overlap and will share qualities in those areas. A split occurs where adjacent zones do not overlap. Layers are bounded by simply picking a high and a low note from the fingerboard. When all of the parameters influencing a layer have been punched in, the layer may be saved into a Song Memory location. Library functions are available for copying a previously configured Song for use as a template in creating a new Song. Layers may thus be set up to perform melody, accompaniment, percussion and effects all from a single instrument.

A SOLO mode has been provided to expand the versatility of the player featuring in live performance. When notes are being held in one or more layers and the SOLO button is pressed, those layers will be expanded to fill the entire fingerboard. This is, if a piano is on Layer #1 and a Fleugelgong is on Layer #2, when notes from both layers are touched and SOLO is pressed, the entire fingerboard will sound Piano/Fleugelgong. This may be considered an on-the-fly super-layer function.

TUNINGS may be created using two basic parameters. First, the open "strings" are tuned. This creates the string pitch-offsets and effects all of the layers on the fingerboard. A special case however, may be easily set up where the open strings have pitches other than ½ step below the notes at the first fret. This allows playing the fingerboard with the standard tuning but having the open strings sound like an open tuning. We call this an open-string capo.

A second tuning parameter disables all of the string offsets within a zone layer and assigns all of its keys to unison tuning. By having multiple keys play the same note many useful percussion effects may be achieved.

The tuning features allow any key or open string to produce any pitch on any channel.

Groups of notes may be assigned to one of the sensing pads or controllers and saved as a chord. The chord may then be played back with velocity-sensing supplied by the pad. Chords, notes or dedicated drum kits may be created this way.

This fingerboard has four basic modes of operation:

1. Guitar mode—no triggers—this outputs the highest fretted (keyed) notes on each row or "string" by pressing the fingerboard keys only.

2. Guitar Mode—Triggers On. This outputs the highest fretted note on each string by pressing the fingerboard keys and striking one or more of the six trigger bars 20. If a trigger bar is struck when no fingerboard key is held on that string (row) the open string will sound. This is similar to the action of a real guitar string.

3. Poly Mode—No Triggers. This will sound as many keys as are pressed anywhere on the fingerboard at any time, by pressing keys on the fingerboard only.

4. Poly Mode—Triggers On. In this mode all depressed keys are played when their corresponding trigger bars 20 are struck.

FIG. 2 is an exploded fragmentary view of the fingerboard assembly formed in the guitar neck. The fingerboard 10 is carried in an elongated, somewhat tapered channel member 22 having the general dimensions and configuration of a guitar neck. Located at the bottom of the channel member 22 is a printed circuit board 32 having twenty sets of switch contacts 34 in each of six rows. The printed circuit board is carried in an assembly including a face member 36 carrying six rows of twenty keys 38. Each key cap 40 presses on a rubber switch member 42 which closes contacts 34 and also presses on an actuator pin 48, discussed below.

There may be a pattern of different colored keys in the fingerboard 10. The pattern may be very simple such as changing the color of every key producing an "E" natural. An additional color might be introduced by coloring every "B" natural. There are many patterns which might be used such as using black and white keys like that of a piano. One extremely useful coloring scheme involves coloring each of the twelve tones of the chromatic scale with a different color. This readily identifies each key name.

FIG. 3 is an exploded perspective view of the internal structure of the fingerboard 10 including the structure of an individual key 38. Each key cap 40 extends through a port 41 in a face member 36 and is a hollow plastic cap covering a rubber switch member 42. On the bottom side of rubber switch member 42 are two conductive pads 44 which, when the key is depressed, move downwardly and bridge across the switch contacts 34 on the printed circuit board 32. This produces a signal which is recognized by the central processing unit as it scans all the key positions on the printed circuit board, which it does at an extremely high rate.

The effect of pressing key 42 against contact 34 is to vary the resistivity resulting in an electrical output varying with the pressure on key cap 40. This output may be supplied to the central processing unit to control, for example, the volume of the note produced when the particular key cap 40 is depressed.

From the foregoing it will be recognized that pressing any of the keys 38 on the fingerboard closes a circuit on the printed circuit board 34 which registers as an output from a given key position. This output is recognized as such by the central processing unit and is converted in MIDI form to a signal requesting a particular note from the synthesizer. At the same time the pressure of the contact 44 against the circuit board 34 establishes a resistance value which results in an output proportional to the pressure on key 38, which output requests a certain volume output. It could vary another variable condition, if desired.

FIG. 4 is an enlarged cross-sectional view taken along line 4—4 of FIG. 3. In this view the rubber switch member 42 is shown which is of essentially non-conducting rubber. Attached at the lower part of switch members 42 is a contact 44 which is a constant conductivity silicone rubber pad. By careful selection of the size and geometry of this pad and the size and space of the mating metallic switch contacts, an effect is achieved which produces a variable resistance with a varying pressure on switch member 42.

Figure 5:
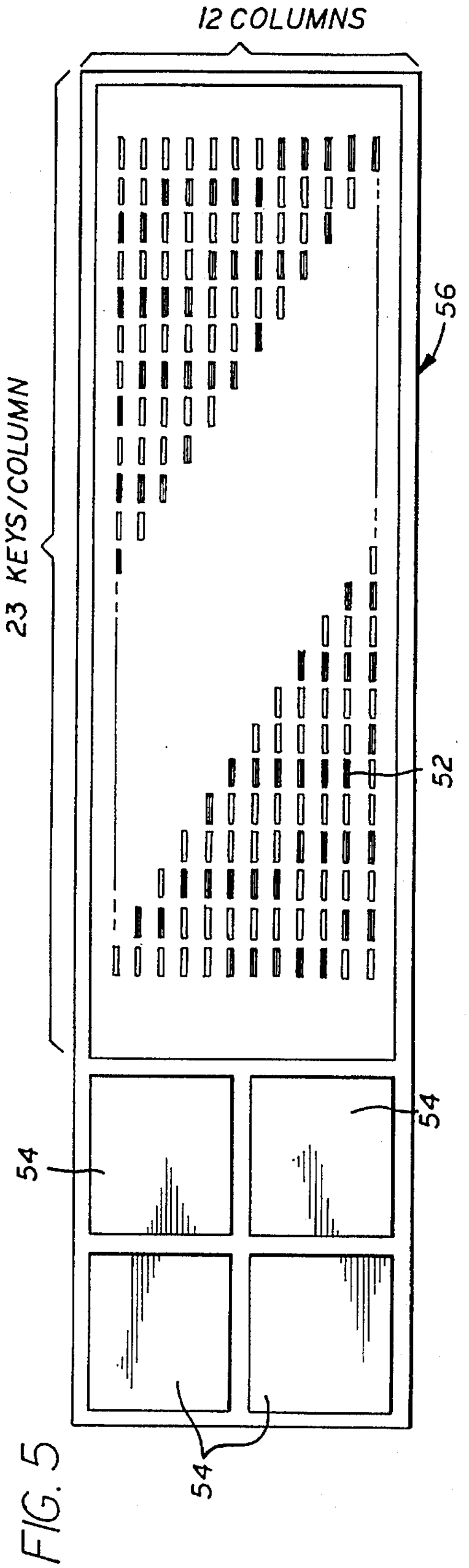
FIG. 5 is a top plan view of another embodiment of my invention.

FIG. 5 is a top plan view of a second embodiment of my invention. This embodiment utilizes much the same organization and structure as described above, but is a larger instrument with the fingerboard arranged in twelve rows of 23 frets (keys). This instrument is played on a table top, much like a conventional electronic keyboard. By adding more strings and frets (columns and rows of keys) the instrument now encompasses six and one half octaves. Many standard guitar finger patterns still apply which, combined with the great range of the instrument, enable a guitar player to play two-handed piano literature.

The fingerboard 52 in addition to having 276 keys arranged in 12 columns or rows of 23 keys each, also incorporates a plurality of pressure sensitive expression pads 54 and software features which, in addition to the variables referred to above such as vibrato, pitchbend, stereo fade, etc., also includes means to re-map the fingerboard 52 into a plurality of zones for special effects and multiple sounds. The base octave of each zone may be set independently. Thus a part of the fingerboard may be programmed to produce guitar-like sounds and another part programmed to produce piano-like sounds. Many combinations become possible. Fingerboard 52 is mounted in a shallow box or housing 56 which contains the key and circuit structure described in connection with FIG. 3 and a central processing unit which may be the same or similar to that referred to above. If desired, a synthesizer could also be incorporated into the housing 56.

Figure 6:
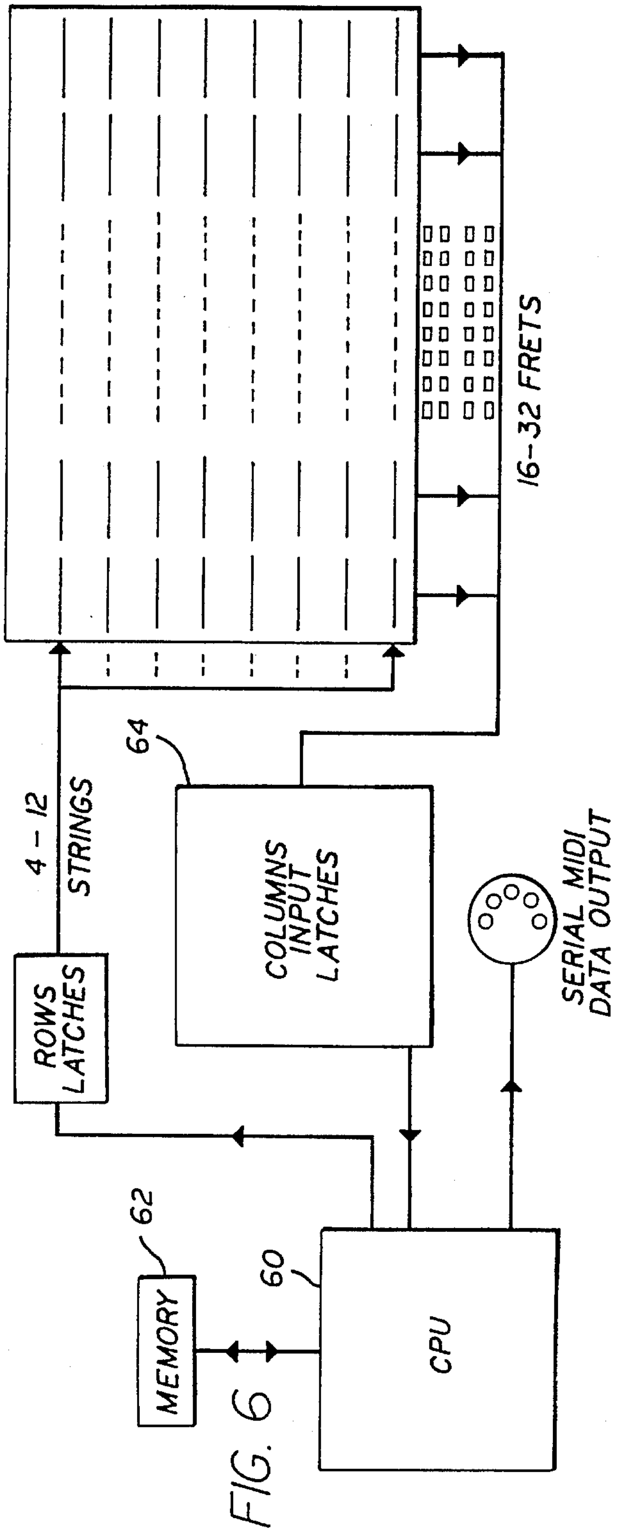
FIG. 6 is a schematic block diagram showing the connections between the fingerboard and the central processing unit and other electronic components.

FIG. 6 is a schematic block diagram of the electrical interface system in applicant's musical instrument for providing a MIDI output to a synthesizer. As indicated above, the output of the fingerboard 10, irrespective of the number of rows or columns, is repeatedly scanned at a high rate by the CPU 60. When it is identified that a given key is pressed, this triggers a response in a memory unit 60 identifying a particular note. One or more memory units 62 connected to the CPU 60 also provide inputs relating to any of several variables such as pitchbend, pitch, vibrato, stereo pan, etc. The memory 62 may also be programmed to tell the CPU 60 to treat certain zones of the fingerboard differently, as where it is desired that one part or zone have piano sounds and another have guitar sounds.

Outputs from the individual key switches from the fingerboard 10 are sensed on a column by column basis and supplied through a series of input latches 64 to the CPU 60. In the CPU the individual key outputs are modified as called for from the memory unit 62, the data are organized in MIDI form and a digital output in MIDI form is supplied to a synthesizer.

Figure 9:
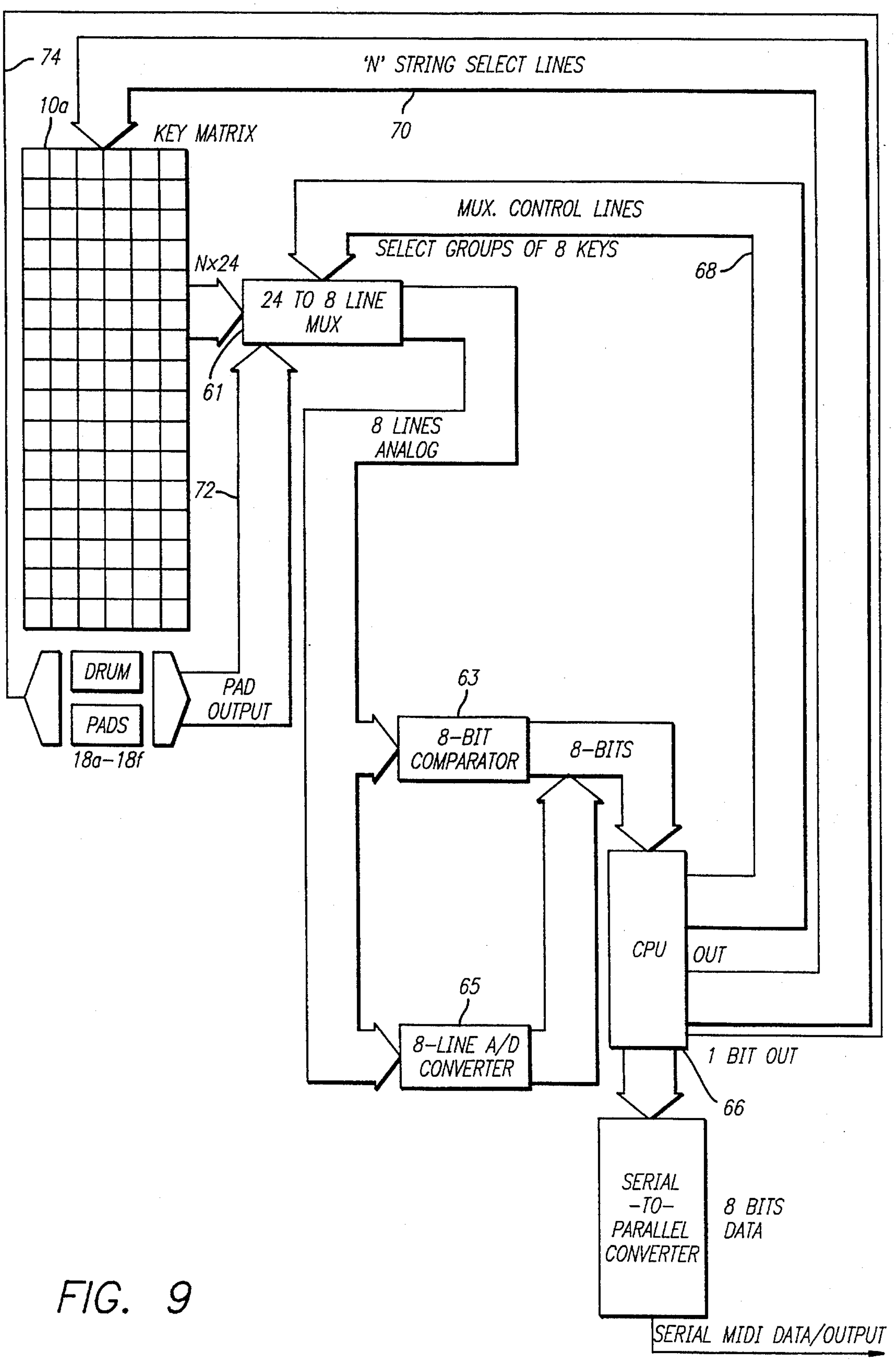
FIG. 9 is a schematic block diagram showing an alternative circuit arrangement connecting the fingerboard to the central processing unit.

FIG. 9 is a schematic block diagram of a somewhat more detailed switching system used with applicant's invention. In this embodiment the keyboard 10 includes a matrix 10*a* of signal sources, one for each key, such as six rows times twenty fret positions. Each such source is connected through a multiple conductor line to a multiplexer 61. Multiplexer 61 is connected to an 8-bit voltage comparator 63 and an analog to digital convertor 65. The central processing unit 66 includes multiplex control lines 68 through which the multiplexer 61 is continually sampled in groups of eight keys, as to whether or not a key input signal is present. Should a first group of keys indicate that all keys are OFF, a next group will be accessed and another comparison made. Should the results of the comparison show that a key has been depressed, that key's voltage is then converted by the analog-to-digital converter into a digital signal whose value depends on the pressure with which the key is pressed as well as its location. This particular processing technique greatly speeds up the processing of key input signals.

Another series of conductors 70 are connected from the central processing unit 66 to the key matrix 10*a* to provide a means of selecting which group of eight keys in a given string to be queried or sampled at any given instant.

Signals from the various pads 18*f*–18*g* are also connected to the multiplexer 60 through a multiple conductor 72. The central processing unit 66 also queries through a conductor 74, which of these pads may be outputting a signal representing pressure on the pad. These signals are processed essentially as described above. The central processing unit converts the signals it receives into MIDI signals which are fed to a serial to parallel convertor 76 and then output as MIDI data to a music synthesizer.

Figure 7:
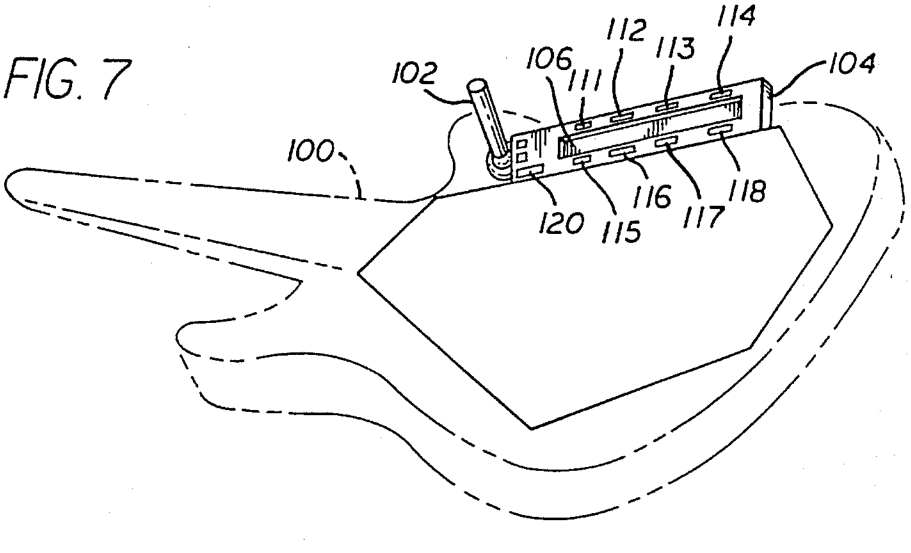
FIG. 7 is a fragmentary perspective view of an additional embodiment of my invention.

FIG. 7 is a fragmentary perspective view of an additional embodiment of my invention. The guitar body 100, shown in phantom, carries, in addition to the sensing pads 18*a*–18*p* and trigger bars 20 (not shown) a separate unit including a joystick 102 and a display unit 104 which includes a screen 106 and a plurality (in this case, eight) buttons 111, 112, 113, 114, 115, 116, 117 and 118 arranged around the periphery of the screen 106. One presses the button nearest the desired selection appearing on the screen to activate it. This provision speeds up the selection of the various musical effects desired.

The joystick 102 is arranged to move in quadrants and each quadrant position may be assigned a specific data entry function and thus performs a sensor function like said sensing pads 18*a*–18*p* and said trigger bars 20. The display unit 104 also includes a separate button 120 called EDIT which is used to enter and exit the programming menus. Some typical menus are described below.

The line-mode menu appears when the system is first turned on. It displays the names of various configurations which have been saved as SONGS. Other SONGS are saved in a battery-backed RAM so that changes will remain after the system is shut off.

One uses the EDIT button to leave the live-mode and enter an EDIT mode. After editing, the EDIT button is again used to return to live mode.

Another menu is called SONG. A SONG consists of:

1) One or more zones or layers;

2) Assignments for the sensing pads, trigger bars and joystick;

3) A scan-mode;

4) An open string tuning.

The screen will display a SONG number and the name by placing the cursor cover the song number and using the joystick or up/down buttons one may scroll through the song banks without going back to the LIVE menu to make a selection.

The WRITE SONG menu includes a temporary buffer which holds all the parameters for the current configuration including any changes made since the current SONG was selected. This menu also makes it possible to make changes to the SONG setup from the LIVE mode and to save the changes.

There is a UTILITY menu which includes a library display. This menu includes a means for changing a velocity curve for a selected layer.

A separate UTILITY/BULK/DUMP menu permits the user to transfer data from the SONG banks to an external MIDI system or to receive data from an external MIDI system.

The LIBRARIAN menu makes it possible to copy any song to any other song location, or exchange two song locations, or erase a song and re-initialize it.

As discussed above each song must have at least one active layer. The LAYER menu displays the layer number presently active. It also includes menus for selecting different layers in a song set-up. There is a position for selecting SOLO except for the layer presently in use. This menu also includes the means to create a LAYER or zone.

A LAYER/MIDI menu selects a MIDI channel for a selected layer. The SCAN/MODE menu triggers fingerboard notes from the trigger bars 20. Certain settings either sound the highest note played on a string (row of keys) or play all the notes on a given string at any time.

A SENSOR mode displays the list of available on-board sensors. The buttons 111–118 or the joystick may be used to see the entire list to make a selection of desired sensors. The list of available effects can be similarly displayed and a selection made.

The SENSOR/CHORD NOTES menu is used to assign up to eight notes which can be assigned to any sensor such as one of the sensing pads or trigger bars.

The TUNINGS menu allows for programming the "open string" tunings for the fingerboard. This allows for changing the pitch of an entire row of keys (one string). This menu also includes a "preset" which, by operation of one of keys 111–118 scrolls through a list of common tunings to save the necessity of tuning each string (row) individually.

Figure 10:
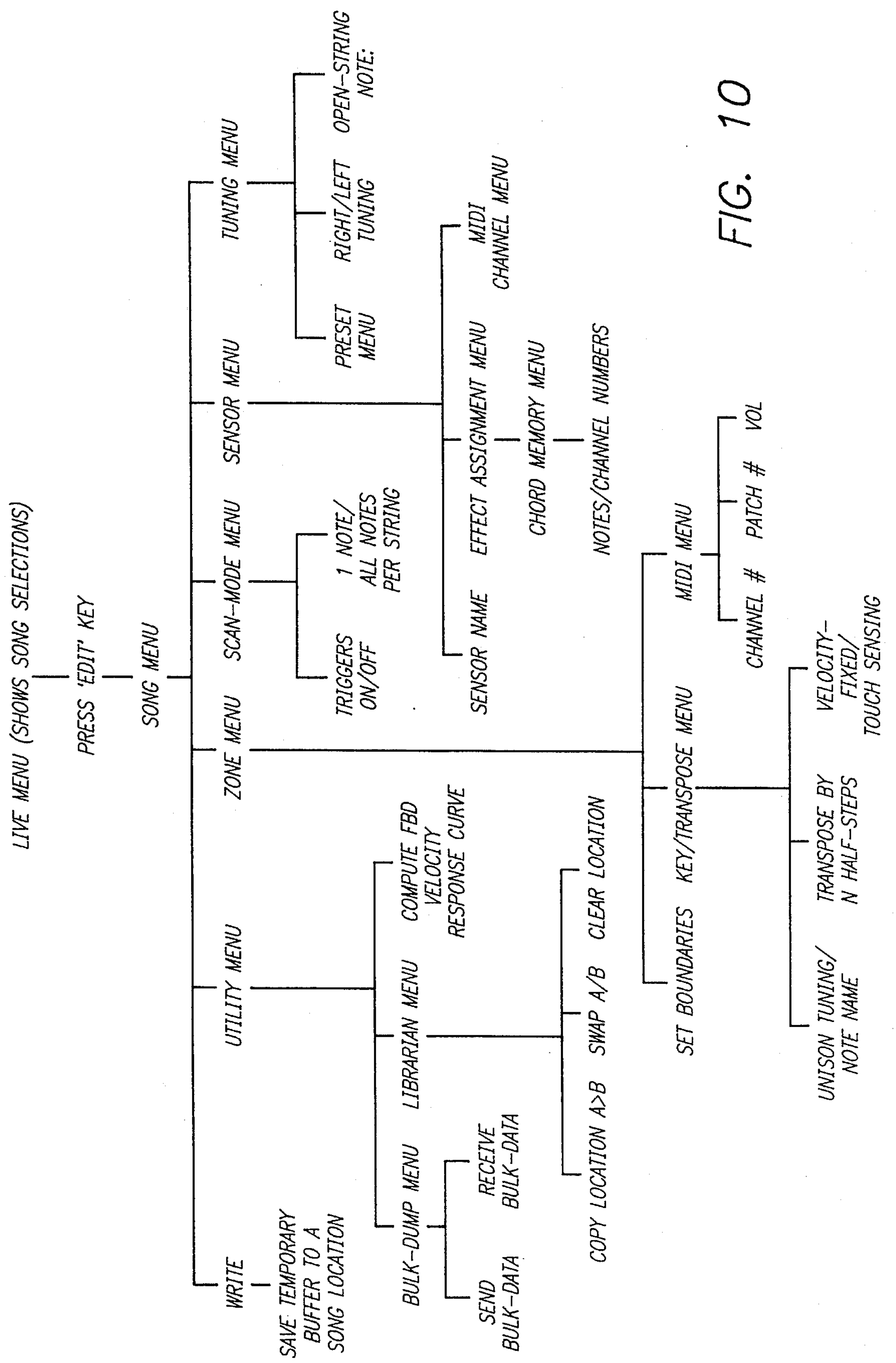
FIG. 10 is a display function menu tree describing certain operations of my invention.

Applicant has incorporated as a central processing unit a Zilog Super-8 processor which is available from Zilog Corp, of Campbell Calif. This processor is programmed to provide the above desired operations by means of the enclosed program listing which are enclosed as an appendix hereto. Applicant has also included a Display Function Menu Tree as FIG. 10 which describes the above menu operations in diagram form.

While only a limited number of embodiments are shown and described herein it is recognized that many modifications within the scope of the present invention will occur to those skilled in the art. The numbers of keys (frets) per row and the number of rows might be varied although it is obvious that the arrangement described in connection with FIGS. 1 and 2 is advantageous for a guitar player. I therefore do not wish to be limited to the embodiments described above but only as established by the following claims as interpreted with the benefit of the doctrine of equivalents.

What is claimed is:

1. For use with a music synthesizer:

an electronic keyboard instrument comprising:

a fingerboard elongated in a first direction;

a plurality of keys arranged in rows and columns along said fingerboard, wherein the rows extend along the fingerboard in said first direction;

a circuit board within said fingerboard;

means for mounting each said key movable independently of every other one of said keys and movable into contact with said circuit board;

a central processing unit;

said circuit board including means for forming key input signals in response to said keys contacting said circuit board;

multiplexing means connected to receive said key input signals from said circuit board, a voltage comparator circuit connected to receive said key input signals from said multiplexing means, an analog to digital converter connected to said multiplexing means;

said central processing unit including means for sampling said voltage comparator circuit and responding to the presence of said key input signals to cause said key input signals to be converted to digital signals in said analog to digital converter, said digital key input signals representing musical notes, and for outputting said digital signals to said synthesizer.

2. An electronic keyboard instrument as claimed in claim 1 wherein memory means is connected to said central processing unit, each said digital key input signal is represented in said memory by a signal representing a specific musical note, and said central processing unit includes programmable means for modifying said signal.

3. An electronic keyboard instrument as claimed in claim 1 wherein a generally guitar-shaped body is attached to said fingerboard, said body includes an array of rubber pads, force sensitive resistance material and switch means are located under said rubber pads, and said switch means is operatively connected to said multiplexing means such that pressing said rubber pads forces said force sensitive material against said switch means to close said switch means thereby providing signals to said multiplexer varying with the pressure on said rubber pads.

4. An electronic keyboard instrument as claimed in claim 1 wherein a body is attached to said fingerboard, a plurality of elongated trigger bars are carried on said body, said trigger bars being connected to said central processing unit.

5. An electronic keyboard instrument as claimed in claim 1 wherein said circuit board includes a normally open switching circuit adjacent each said key, and a cover on said fingerboard with openings for each said key and each said key includes a switch member of elastomeric material including conducting contacts overlying each said switching circuit means and a key cover covering the top of each said switch member such that depressing any said key cover causes said contacts to close one of said switching circuit means.

6. For use with a synthesizer having MIDI input means;

an electronic keyboard instrument comprising a housing, a fingerboard elongated in a first direction carried on said housing;

a plurality of keys arranged in rows and columns along said fingerboard wherein the rows extend along said fingerboard in said first direction;

a circuit board within said fingerboard;

means for mounting each said key movable independently of every other one of said keys and movable into contact with said circuit board;

a central processing unit;

said circuit board including means for forming key input signals in response to said keys contacting said circuit board;

multiplexing means connected to receive said key input signals from said circuit board, a voltage comparator circuit connected to receive said key input signals from said multiplexing means, an analog to digital converter connected to said multiplexing means;

said central processing unit including a memory, means for sampling said voltage comparator circuit and responding to the presence of said key input signals to cause said key input signals to be converted to digital key input signals in said analog to digital converter, said digital key input signals being connected to said memory, each said digital key input signal being represented in said memory by a signal representing a musical note, and means outputting said digital key input signals to said synthesizer.

7. An electronic keyboard instrument comprising a keyboard, a plurality of keys arranged in rows and columns on said keyboard;

a circuit board within said keyboard;

means for mounting each said key movable independently of every one of said keys and movable into contact with said circuit board;

a central processing unit;

said circuit board including means for forming key input signals in response to said keys contacting said circuit board;

multiplexing means connected to receive said key input signals from said circuit board;

a voltage comparator circuit connected to said multiplexing means to receive key input signals from said multiplexing means;

an analog to digital converter connected to said multiplexing means;

said central processing unit including means for sampling said voltage comparator circuit and responding to the presence of said key input signals to cause said key input signals to be converted to digital signals in said analog to digital converter, and means outputting said digital key input signals.

8. For use with a music synthesizer:

an electronic keyboard instrument comprising:

a fingerboard elongated in a first direction;

a plurality of keys arranged in rows and columns along said fingerboard, wherein the rows extend along the fingerboard in said first direction;

a circuit board within said fingerboard;

means for mounting each said key movable independently of every other one of said keys and movable into contact with said circuit board;

a central processing unit including means programming signals representing a plurality of musical instrumental formats;

a body attached to said fingerboard, a plurality of sensors carried on said body and connected to said central processing unit; and means for selecting said key input signals from an arbitrary rectangular zone of said fingerboard and connecting said key input signals to a musical instrument format in said central processing unit such that actuation of any of said keys in said zone will cause said central processing unit to output MIDI signals relating said key input signals to said musical instrument format.

9. An electronic keyboard instrument as claim in claim 8 wherein a selected plurality of said keys are actuatable to produce a group of said key input signals representing a musical chord, one of said sensors is connectable to said group of key input signals such that a single actuation of said one of said sensors causes said central processing unit to provide a MIDI output signal representing said musical chord.

10. An electronic keyboard instrument as claimed in claim 8 wherein said selecting means further provides for selecting an additional arbitrary zone of said fingerboard and connecting said key input signals to a separate musical instrument format in said central processing unit such that actuation of any of said keys in the first said zone will cause said central processing unit to output MIDI signals in one musical instrument format and actuation of any of said keys in said other zone will cause said central processing unit to output MIDI signals in another musical instrument format.

11. An electronic keyboard instrument as claimed in claim 8 wherein switch means are provided for expanding said zone to the entire said fingerboard.

12. An electronic keyboard instrument as claimed in claim 10 wherein switch means are provided for expanding both said first named zone and said additional zone to the entire said fingerboard.

13. For use with a music synthesizer:

an electronic keyboard instrument comprising:

a fingerboard elongated in a first direction;

a plurality of keys arranged in rows and columns along said fingerboard, wherein the rows extend along the fingerboard in said first direction;

a circuit board within said fingerboard including means for forming key input signals in response to said keys contacting said circuit board, and means mounting each said key movable independently of every other one of said keys into contact with said circuit board;

a central processing unit including means programming signals representing a plurality of musical instrumental formats;

multiplexing means connected to receive said key input signals from said circuit board;

a voltage comparator circuit connected to said multiplexing means for receiving said key input signals and connected to said central processing unit;

an analog to digital converter connected to said multiplexing means and to said central processing unit;

said central processing unit including means for sampling said voltage comparator circuit and responding to the presence of said key input signals to cause said key input signals to be converted to digital signals in said analog to digital converter; and means for selecting said key input signals from an arbitrary rectangular zone of said keyboard and connecting said key input signals to a musical instrument format in said central processing unit such that actuation of any of said keys in said zone will cause said central processing unit to output MIDI signals relating said key input signals to said musical instrument format.

* * * * *